United States Patent [19]

Kauffman

[11] Patent Number: 4,620,729
[45] Date of Patent: Nov. 4, 1986

[54] ROUND PIPE STARTER FITTING

[75] Inventor: Melvin E. Kauffman, Lathrop, Calif.

[73] Assignee: Tru-Fit Mfg., Inc., Lathrop, Calif.

[21] Appl. No.: 717,969

[22] Filed: Mar. 28, 1985

[51] Int. Cl.$^4$ .............................................. F16L 41/00
[52] U.S. Cl. ................... 285/158; 285/424; 285/915
[58] Field of Search ............... 285/158, DIG. 16, 189, 285/424, 413, 415, 915

[56] References Cited

U.S. PATENT DOCUMENTS

| 1,143,824 | 6/1915 | Haese | 285/189 X |
| 1,192,150 | 7/1916 | Appleton | 285/158 |
| 2,180,960 | 11/1939 | Kennedy | 285/DIG. 16 X |
| 2,542,583 | 2/1951 | Shea, Jr. | 285/158 |
| 2,650,114 | 8/1953 | Epstein | 285/424 X |
| 2,911,239 | 11/1959 | Marzolf, Sr. | 285/415 |
| 3,549,179 | 12/1970 | Cox | 285/189 |
| 3,650,551 | 3/1972 | Akers | 285/158 |
| 3,865,411 | 2/1975 | Rowe et al. | 285/915 X |
| 4,022,205 | 5/1977 | Tenczar | 285/DIG. 16 X |
| 4,249,758 | 2/1981 | Harris | 285/423 X |

FOREIGN PATENT DOCUMENTS

| 192388 | 8/1888 | France | 285/412 |
| 416954 | 8/1910 | France | 285/415 |
| 2056005 | 3/1981 | United Kingdom | 285/158 |

Primary Examiner—Thomas F. Callaghan
Attorney, Agent, or Firm—Harvey B. Jacobson

[57] ABSTRACT

A tubular body is provided having first and second ends and the first end includes structure for connection with one end of a tubular duct while the second end of the body defines a peripherally extending and outwardly opening groove. A pair of semi-annular sheetmetal sections have their inner peripheral portions edgewise engaged and seated within the groove at the first end of the tubular body and the semi-annular sections are of slightly greater than 180° in angular extent and have their opposite ends overlapped and joined together. The semi-annular sections, after being joined together, define an annular collar mounted on the first end of the tubular body against removal therefrom and the side of the annular collar facing outwardly of the first end of the tubular body has an annular resilient gasket mounted thereon whose outer side includes an adhesive coating for adhesive securement to a duct wall about an opening formed in that duct wall.

4 Claims, 4 Drawing Figures

U.S. Patent    Nov. 4, 1986    4,620,729
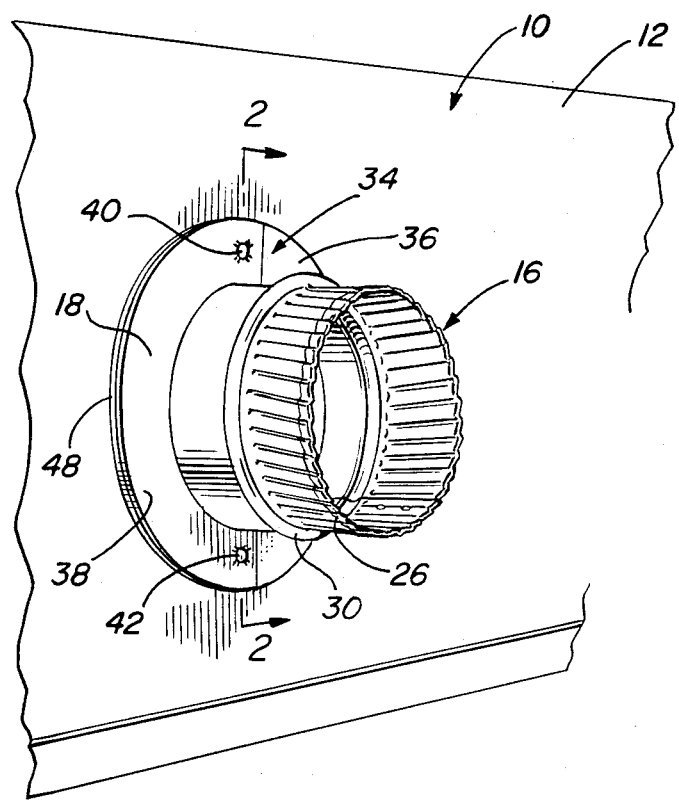
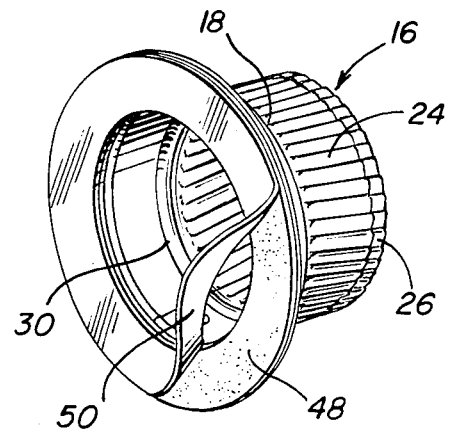
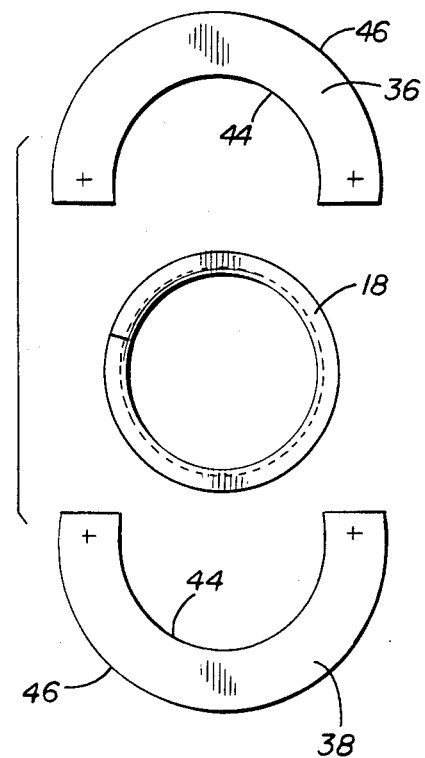
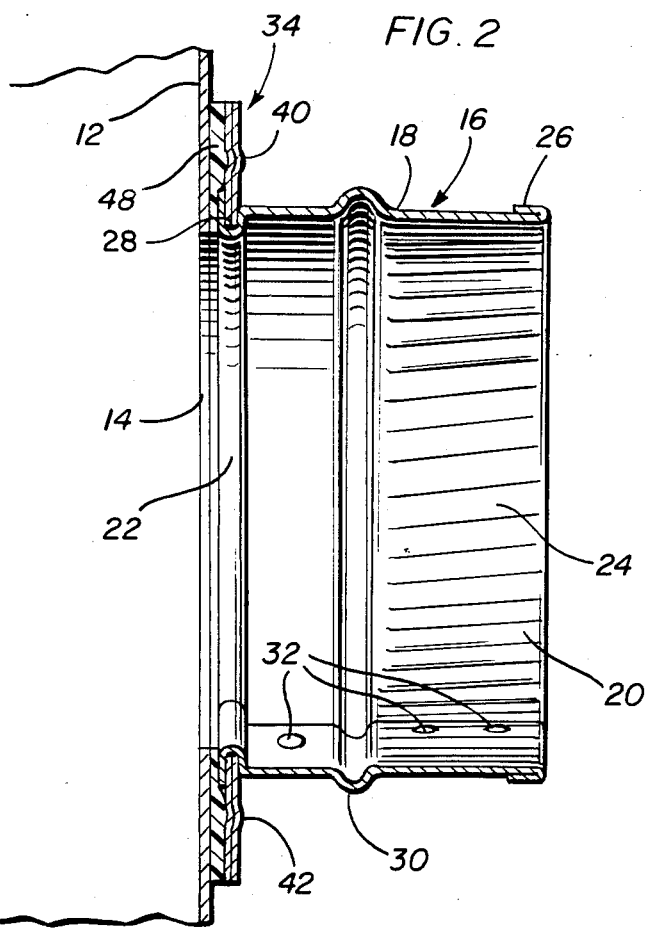

ROUND PIPE STARTER FITTING

BACKGROUND OF THE INVENTION

1. Field of the Invention

This invention relates to a connecting fitting whereby a branch duct or pipe may be connected to and communicated with the interior of a main duct or pipe.

2. Description of Related Art

Various different forms of connecting fittings including some of the general structural and operational features of the instant invention are disclosed in U.S. Pat. Nos. 3,865,411, 3,892,049, 3,954,289, 4,030,494, 4,058,261, 4,147,382 and 4,249,758. However, these previously known forms of duct work connecting fittings may not be readily constructed of sheet material while at the same time being operable to quickly establish an airtight connection between a main duct and a branch duct.

SUMMARY OF THE INVENTION

Conventionally, in the heating and air conditioning duct field various interdigitated flange sections must be cut and bent from those areas of a main duct wall defining an opening therein and a mounting flange portion of a tubular fitting to be registered with the opening for communicating a branch duct with the interior of the main duct. The flange portions of the main duct are then secured to corresponding portions of the fitting by sheet metal screws and the flange portions of the fitting are secured to the sheet metal duct wall about the opening by sheet metal screws. This type of connection is subject to considerable air leakage and is time consuming to effect. In addition, other types of duct fittings of substantially one-piece construction heretofore have been provided for substantially airtight adhesive connection with the wall area of a duct disposed about an opening formed therein for joining a branch duct to a main duct. However, these previously known forms of adhesive equipped fittings are expensive to produce and still require the utilization of attaching screws which are time consuming to install. Accordingly, a need exists for an improved form of fitting for joining and communicating a branch duct to a main duct and its interior.

The connecting fitting of the instant invention includes a tubular body having first and second ends with the first end including structure for telescopic connection with one end of a branch duct. The second end of the tubular body defines a peripherally extending and outwardly opening groove and a substantially annular sheet material collar assembly has its inner periphery tightly seated in the aforementioned groove. The side of the collar assembly remote from the first end of the tubular body includes an annular gasket mounted thereon having an adhesive outer surface for adhesive securement to the outer surface of the wall portion of a main duct disposed about an opening formed therein. The annular collar assembly includes a pair of substantially semi-annular sheet material sections of slightly greater than 180° in angular extent and with the arc ends thereof overlapped and joined together through the utilization of a "stamp-lock" connection to form a full annular collar assembly, the overlapped ends of the semi-annular sections of the collar assembly being secured together after the inner peripheral portions of the semi-annular sections are seated in the aforementioned groove. In this manner, the annular collar assembly is locked in engagement with the tubular body.

The main object of this invention is to provide a connecting fitting for joining a tubular branch duct to one sidewall portion of a main duct and with a substantially airtight connection being defined between the main and branch ducts.

A further object of this invention is to provide a connecting fitting whose major components are constructed from sheetmetal.

An ancillary object of this invention is to provide a duct joining fitting in accordance with the preceding objects and designed in a manner whereby the sheetmetal components of which the fitting is constructed may be cut in different sizes from a large sheetmetal sheet with a minimum of waste.

A final object of this invention to be specifically enumerated herein is to provide a duct connecting fitting in accordance with the preceding objects and which will conform to conventional forms of manufacture, be of simple construction and easy to use so as to provide a device that will be economically feasible, long lasting and relatively trouble free in installation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the connecting fitting of the instant invention mounted upon one sidewall portion of a main duct and preparatory to telescopic engagement of one end of a branch duct with the fitting;

FIG. 2 is an enlarged fragmentary vertical sectional view taken substantially upon the plane indicated by the section line 2—2 of FIG. 1;

FIG. 3 is a perspective view of the fitting with the protective sheet for the adhesive coated gasket partially removed; and FIG. 4 is an exploded elevational view of the sheetmetal components of the fitting illustrating the semi-annular collar sections preparatory to engagement with the tubular body portion and securement of the semi-annular collar sections together about the tubular body section.

DESCRIPTION OF THE PREFERRED EMBODIMENT

Referring now more specifically to the drawings, the numeral 10 generally designates a main duct including a planar vertical wall 12 having a circular opening 14 formed therethrough.

The starter fitting of the instant invention is referred to in general by the reference numeral 16 and includes a tubular body 18 having first and second ends 20 and 22. The first end 20 includes circumferentially spaced and longitudinally extending corrugations and an out and back turned catch flange 26 at its free end. The second end 22 of the tubular body includes a radially outwardly opening circumferential groove 28 formed therein and the longitudinal mid-portion of the tubular body 18 includes a peripherally extending inwardly opening channel 30 formed therein. The tubular body is constructed from a generally rectangular piece of sheetmetal in which the corrugations 24, the catch flange 26, the groove 28 and the channel 30 have been formed by conventional sheetmetal forming machines and the rectangular piece of sheetmetal is bent into a cylindrical configuration with the opposite ends of the sheetmetal section of which the tubular body is constructed overlapped and secured together as at 32. Thus, the cylindrical body 18 may be readily formed.

A collar assembly referred to in general by the reference numeral 34 is provided and includes a pair of semi-annular sheetmetal sections 36 and 38 of slightly greater than 180° in angular extent and having the arc ends thereof disposed in overlapped engagement and secured together by the "stamp-lock" system as at 40 and 42. The semi-annular sections 36 and 38 include inner peripheral edges 44 as well as outer peripheral edges 46 and the inner peripheral edges 44, before the semi-annular sections 36 and 38 are secured together, are tightly seated in the groove 28. Thus, when the semi-annular sections 36 and 38 are secured together as at 40 and 42, the collar assembly 34 is formed with the inner periphery thereof tightly seated in the groove 28.

A resilient annular gasket 48 is provided and includes adhesive on its opposite axial faces. The gasket 48 is adhered to the side of the collar assembly 34 remote from the first end 20 of the tubular body 18 and the outer side of the gasket 48 facing outwardly of the second end 22 of the tubular body 18 includes a protective annular sheet 50 overlying the adhesive coating thereon.

After the opening 14 has been formed in the duct 10, it is merely necessary to remove the sheet 50 and to place the collar assembly 34 in position against the outer surface of the duct 10 about the opening 14, the adhesive side of the gasket 48 exposed by removal of the sheet 50 being sufficient to form a substantially airtight mounting of the collar assembly 34 on the duct 10. Then, a branch duct of the proper size may have one end thereof telescoped over the first end 20 of the tubular body 18.

It is pointed out that the radial extent of the semi-annular components 36 and 38 is slightly less than one inch. In this manner, sections 36 and 38 for collar assemblies of graduated sizes and differing by one inch in diameter may be cut from the same sheet of sheetmetal with a minimum of wastage of sheetmetal material.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A connecting fitting for joining a lateral tubular member to a main tubular member, said connecting fitting including a tubular sheet material body having first and second ends, said first end including means for connection with one end of said lateral member, said second end defining a peripherally extending and outwardly opening groove, a substantially annular sheet material collar assembly including an inner periphery tightly seated in said groove, the side of said collar assembly remote from said first end including a flat annular resilient gasket secured thereto having an adhesive outer surface for adhesive securement, only, to an outer surface of a wall portion of said main tubular member extending about an opening formed in said main tubular member, said annular collar assembly including a pair of substantially semi-annular sheet material sections of slightly greater than 180° in angular extent with the arc ends thereof overlapped and joined together by a stamp lock securing means said groove being of a width equal to twice the thickness of said sheet material sections.

2. The fitting of claim 1 wherein said sheet material sections comprise metal sheet material sections.

3. The fitting of claim 1 wherein said tubular body is constructed of sheetmetal.

4. The fitting of claim 1 wherein said tubular body is constructed from an elongated strip of sheet material rolled into a generally cylindrical form and including overlapped ends secured together.

* * * * *